United States Patent [19]

Larsson et al.

[11] Patent Number: 5,430,720
[45] Date of Patent: Jul. 4, 1995

[54] IDENTIFICATION OF DATA PACKETS BY INCLUDED SELECTED BITS

[75] Inventors: Leif M. Larsson, Hägersten; Hans M. Nilsson, Huddinge; Björn I. Johansson, Stockholm; Hans A. P. Berghager, Älvsjö, all of Sweden

[73] Assignee: Telefonaktiebolaget LM Ericsson, Stockholm, Sweden

[21] Appl. No.: 145,625

[22] Filed: Nov. 4, 1993

[30] Foreign Application Priority Data

Nov. 9, 1992 [SE] Sweden ................. 9203332

[51] Int. Cl.⁶ .................................. H04L 12/56
[52] U.S. Cl. ........................... 370/60; 370/94.1; 370/110.1
[58] Field of Search ................. 370/13, 17, 58.1, 58.2, 370/58.3, 60, 60.1, 79, 85.6, 94.1, 94.2, 110.1, 111, 82; 340/825.06, 825.07, 825.5, 825.51, 825.52, 825.79

[56] References Cited

U.S. PATENT DOCUMENTS

| | | | |
|---|---|---|---|
| 4,956,839 | 9/1990 | Torii et al. | 370/60 |
| 5,067,123 | 11/1991 | Hyodo et al. | 370/94.1 |
| 5,084,867 | 1/1992 | Tachibana et al. | 370/60 |
| 5,109,378 | 4/1992 | Proctor et al. | 370/60 |
| 5,119,369 | 6/1992 | Tanabe et al. | 370/60 |
| 5,130,984 | 7/1992 | Cisneros | 370/94.1 |
| 5,142,653 | 8/1992 | Schefts | 370/60 |
| 5,159,591 | 10/1992 | Gohara et al. | 370/60 |
| 5,166,926 | 11/1992 | Cisneros et al. | 370/60 |
| 5,251,209 | 10/1993 | Jurkevich et al. | 370/60 |
| 5,263,024 | 11/1993 | Kumaki et al. | 370/94.1 |
| 5,267,232 | 11/1939 | Katsube et al. | 370/17 |
| 5,280,483 | 1/1994 | Kamoi et al. | 370/94.1 |
| 5,303,233 | 4/1994 | Sugawara | 370/60 |
| 5,325,358 | 6/1994 | Goeldner | 370/60 |

FOREIGN PATENT DOCUMENTS 482550  4/1992  European Pat. Off. .

Primary Examiner—Alpus Hsu
Attorney, Agent, or Firm—Burns, Doane, Swecker & Mathis

[57] ABSTRACT

Identification of data packets in switching equipment included in a telecommunication system and known as a packet switch. A plurality of incoming links are connected to the switching equipment via first switch ports, and a plurality of outgoing links are connected to the switching equipment via second switch ports. The equipment also includes control and coupling devices required to connect an incoming link with an indicated link, where the indication of an outgoing link is initiated by signals in the form of one or more data cells occurring on an incoming link. Additional information in the form of additional bits is delivered to the data cell in the first switch port and the additional bits are given a configuration which corresponds to the address information in the data cell. The additional bits are removed in the second switch port. The additional bits include a category identification and/or a function identification.

17 Claims, 3 Drawing Sheets

IDENTIFICATION OF DATA PACKETS BY INCLUDED SELECTED BITS

BACKGROUND

The present invention relates to a switching equipment, and relates more precisely to the identification of data packets in such a switching equipment, that forms part of a telecommunication system, and more particularly the type of switching known as packet switching.

Packet switches are included in a network in which data cells or data packets are transmitted from a transmitter to a receiver, each data cell including an address part and an information part.

A plurality of incoming links are connected to the packet switch via first switch ports, and a plurality of outgoing links are connected to the switch via second switch ports. The switching equipment also includes the control means and coupling means that are needed to control switch functions and operations, so that coupling means pointed out by the control means will connect incoming link: with indicated outgoing link, where indication of the outgoing link, is initiated by signals occurring on the incoming link.

These signals are special signals, and are normally standardized and formed by one or more data cells. Each of the data cells has a constant length of 53 octets, according to CCITT standards, of which 5 octets are included in a so-called Header which contains, among other things, a virtual destination address, and 48 octets which make up a so-called information part.

Several different types of packet switches of the aforedescribed kind are known to the art.

Thus, it is known to use the virtual destination address in the data cell to control the operating functions of a packet switch. To this end, it is necessary to look-up a table in a relevant memory each time information relating to the desired destination address is required for controlling the switch through said control means.

In order to look-up a table, it is normally necessary to establish the address information in the data cell Header, preferably with the aid of a processor assigned to the control means, and transpose the address information to address information that is adapted to the processor and system and then guide the operational functions of the switching equipment with the aid of this processor-adapted address information.

Also known to the art are packet switches that are constructed in accordance with an ATM system (Asyncronous Transfer Mode). The invention finds particularly suitable application with this type of switching equipments.

Considering the significant features related to the present invention the most relevant prior art is disclosed in the publication U.S. Pat. No. 5,130,984.

Among other publications, related to this technical field, we refer to the publication EP-A1-0 482 550.

SUMMARY

Technical Problems

When considering known telecommunication systems, and then particularly telecommunication systems of the kind defined in the introduction, which include packet switches, it will be seen that a technical problem resides in the creation of conditions, with the aid of simple means, which will enable a reduction in hardware to be made and also enable signalling procedure to be simplified within the switching equipment, particularly with regard to initiating and carrying out the setting-up of a connection through the switch. using significant bit positions within the "Header" for identifying a selected category and/or a selected function.

A further technical problem is one of realizing that conditions can be created whereby sub-information belonging to the major information can be left unused when forming the additional bit configuration, such as the so-called PT-cells (Payload Type).

It will also be seen that a further technical problem is one of realizing the advantages that are afforded by storing in a buffer memory in each first switch port that is used, in order to evaluate the address information of the data cell and to distinguish between or identify different types of data cells, so that a first type of data cell which carries signalling information in the data cell Header calls for the cooperation of the processor and/or the control means which, in accordance with the bit configuration in the information part, evaluates an appropriate through connection and channel number selection and accordingly generates an appropriate bit configuration for said additional bits, whereas another type of data cell that carries in the data cell Header information which is dependent on the channel number is allocated the additional bit configuration..

It will also be seen that another technical problem is one of realizing the significance of evaluating the routing or address information contained in the Header of an incoming data cell only once (or only a few times) by the control means so as to form said additional bits with a bit configuration that is adapted directly to the control system of the switching equipment and to the status of said system and corresponding to the current routing or address information in the data cell, and by allotting said additional bit configuration in incoming switch ports to subsequent data cells containing routing or address information allocated by the control means, without calculation in the control means.

A further technical problem is one of realizing the significance of and the advantages afforded by allocating to said additional bits a particular bit configuration which corresponds directly to a current cell type and/or to a requested transmission quality.

It will also be seen that a very particular technical problem is one of realizing the advantages that are afforded when the additional information generated by the control means in the form of an additional bit configuration is dependent, among other things, on VPI/VCI information (Virtual Path Identifier, Virtual Channel Identifier) in the data cell header.

The invention finds particular application in ATM type packet switches.

SOLUTION

With the intention of solving one or more of the aforesaid technical problems, the present invention is based on a packet switch included in a known telecommunication system.

With the intention of solving one or more of the aforesaid technical problems, it is proposed in accordance with the present invention that said additional bits include a number of bit positions, representing a category identification of the data cell concerned and/or that said additional bits include a number or other bit positions, representing a functional identification of the data cell concerned.

According to further developments of the invention which fall within the inventive concept, the category identification and/or the functional identification are evaluated by looking-up a table in a memory.

The additional bits may also have a bit configuration corresponding to the type of cell concerned and/or transmission quality.

Solely these additional bits can now be used to control the various functions in the switching equipment as the data cell passes therethrough.

These additional bits can be given advantageously a bit configuration which will enable them to be used for redundancy termination and/or data packet identification and/or the acceptance or rejection of a relevant data cell and/or identification of different data packets.

When the coupling means include two switch arrays, two switch planes, the additional bits can be used to control:

a) termination via a specified algorithm;
b) that data cells reach their intended destination via plane B;
c) that data cells reach their intended destination via plane A;
d) that data cells from both planes reach their intended direction.

It is also proposed that the additional information is formed, among other things, by the occurrence of VPI/VCI information in the data cell.

ADVANTAGES

Those advantages primarily afforded by an inventive switching equipment reside in the provisions of conditions which enable a reduction to be made in the hardware required in the switching equipment to handle incoming data cells. This is achieved by simplifying internal signalling procedures within the switching equipment, by introducing additional information, such as an additional bit configuration, which can be used solely within the switching equipment.

This simplification is based on an initial evaluation of the routing and address information contained in the data cell header, and on transposing this information to additional information adapted to the control and operational function of the switching equipment on the basis of this evaluation, and also by giving some bit positions within said additional bits a category and/or functional identification.

The additional bits are removed in outgoing switch ports, so that incoming data cells and outgoing data cells will have a standardized format with regard to the switching equipment.

BRIEF DESCRIPTION OF THE DRAWINGS

An exemplifying embodiment of the present invention comprising features significant to the invention will now be described in more detail with reference to the accompanying drawings, in which.

DETAILED DESCRIPTION

Figure 1:
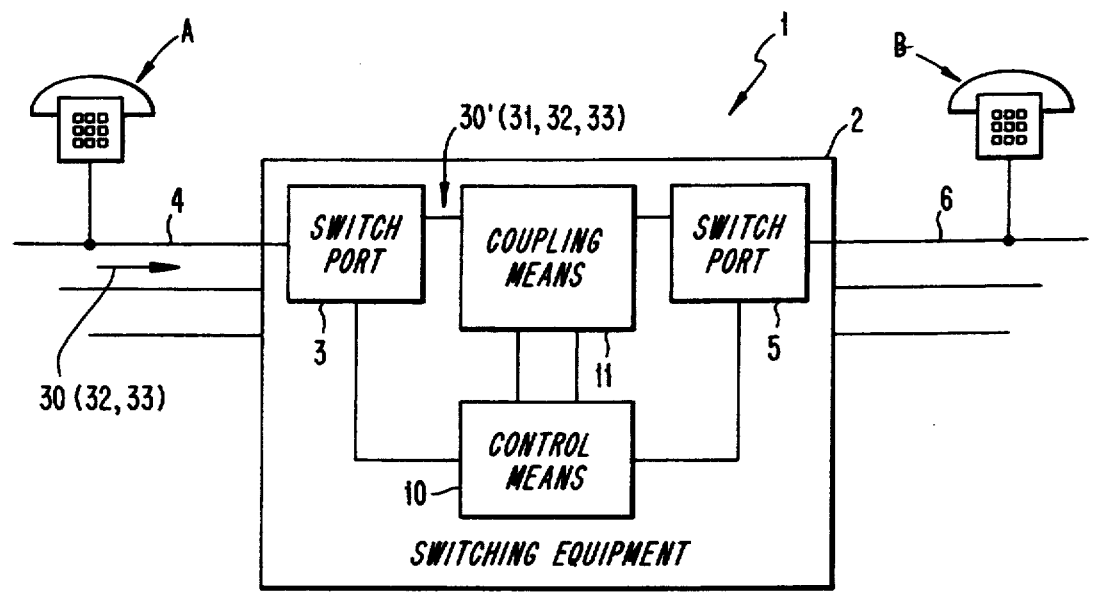
FIG. 1 is a very simplified view of an ATM-switch included in a telecommunication system.

FIG. 1 is a very simple illustration of switching equipment 2 of the kind referred to as an ATM-switch, forming part of a telecommunication system 1.

The ATM technique is known to the art and it is therefore unnecessary to provide a detailed description of this technique in this document.

A plurality of incoming links 4 are connected to the switching equipment 2 via first switch ports 3, while a plurality of outgoing links 6 are connected to the switch via second switch ports 5.

The switching equipment 2 also includes necessary control means 10 and a processor which is either incorporated in the control means 10 or is separate therefrom, and coupling means 11 which function to connect an incoming link 4 to an indicated outgoing link 6, this outgoing link being indicated or pointed-out by signals in the form of one or more data signals occurring on the incoming link 4.

This connection of incoming links to outgoing links and the fundamental requisites therefor will be described in more detail below.

The data cells 30 have a CCITT-standard, and include 5 octets in a header which includes a virtual destination address, and 48 octets in an information part which contains actual information.

The invention is based on the understanding that the information content of the data cell header and the bit configuration distribution in said header is not intended to simply serve as a direct switch control means. For this purpose, an information content and bit configuration adapted to the switching equipment control system is required.

In general terms, the invention is based on delivering to said data cell in said first switch port additional information in the form of an additional bit configuration, and to give these additional bits a configuration which, among other things, is dependent on the address information occurrent in the data cell header, which means that these extra bits are used solely internally in the switching equipment (instead of the bit configuration in the data cell header) to control selected functions. The additional bits are removed in the second switch port 5.

Thus, when the data cells pass through the switching equipment, the cells have an information content which is not only adapted directly to the functions of the switching equipment but also to the virtual address information in the data cell header and to the instantaneous status of the switching equipment. This facilitates function initiation and control in the switching equipment, without needing to interpret the specific address information carried by the incoming data cell header each time a function that requires address information is initiated, while fulfilling standard requirements at the same time, namely that incoming data cells and outgoing data cells shall have a standardized format in relation to the switching equipment.

Figure 2A:
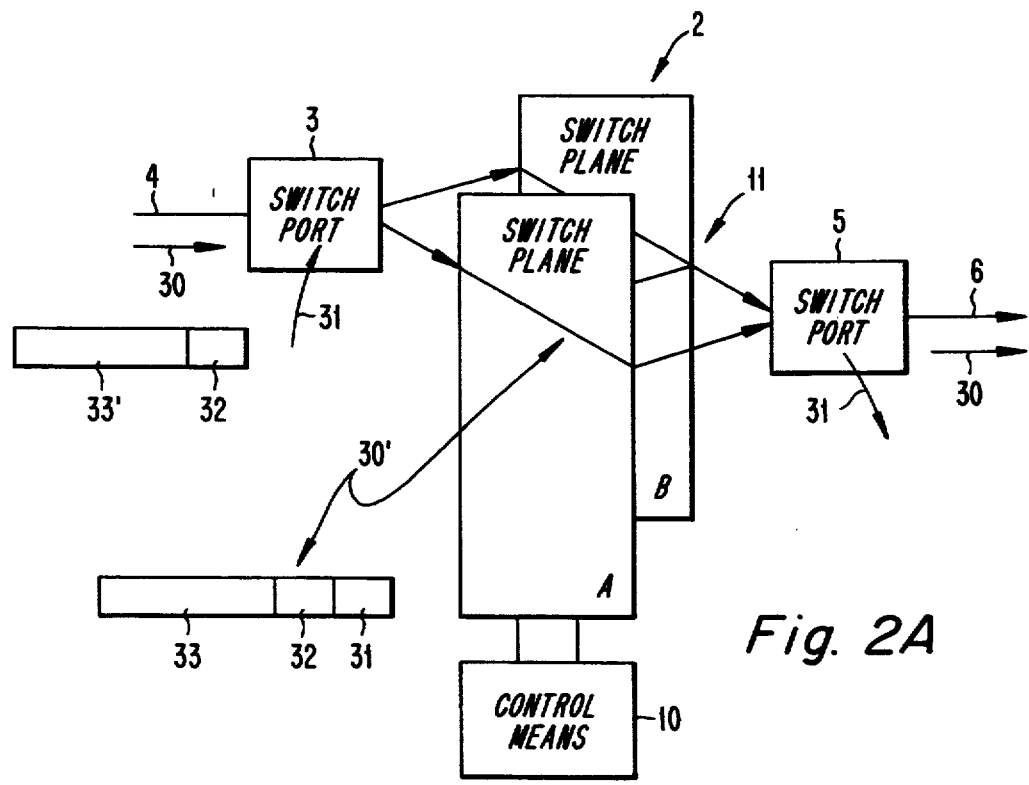
FIGS. 2A and 2B illustrate in principle the introduction of an additional bit configuration at the input of the switch equipment, and removal of this bit configuration at the output of said equipment.
Figure 2B:
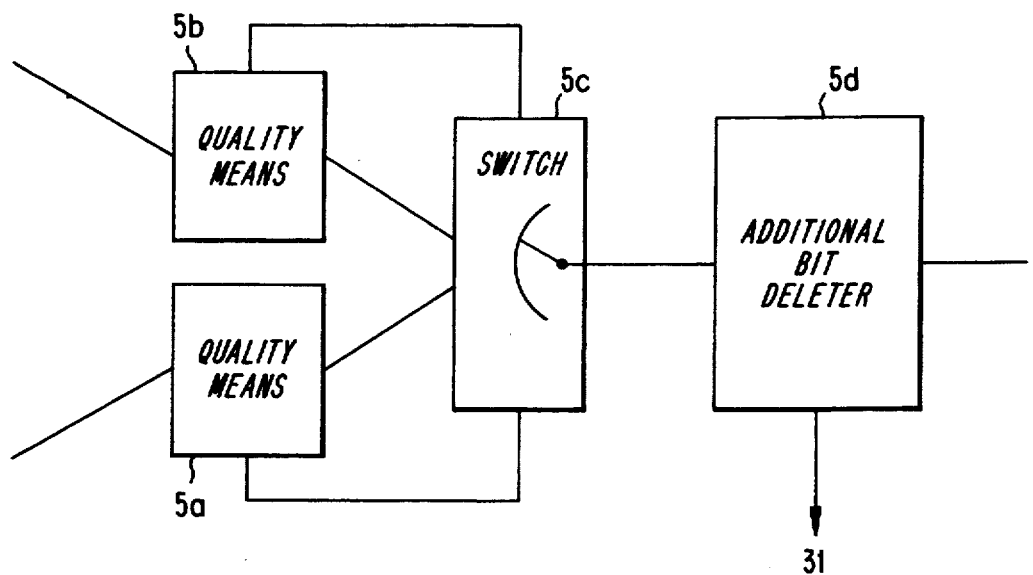
Figure 3:
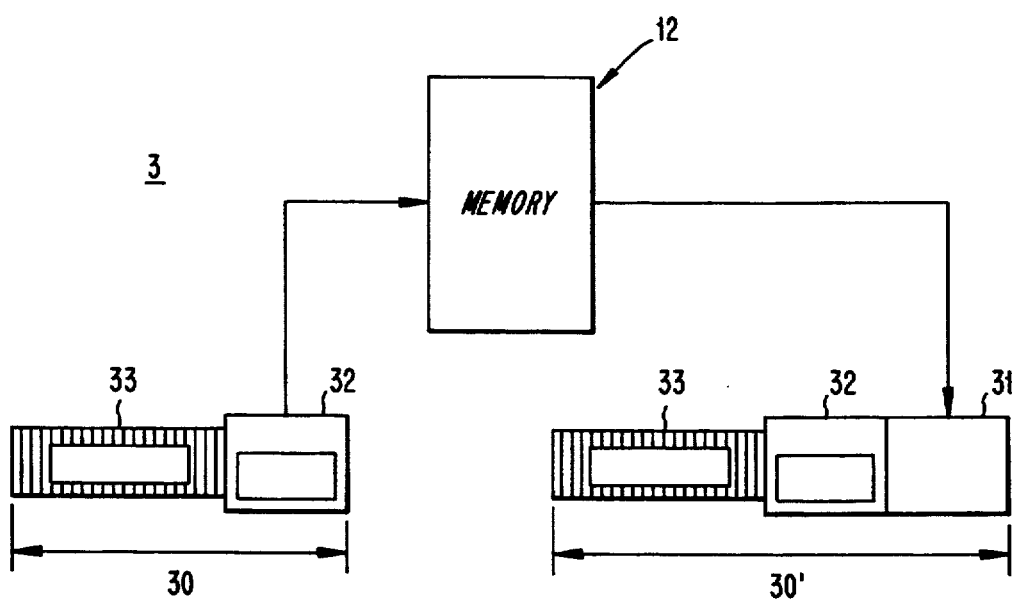
FIG. 3 illustrates in principle a relevant table look-up required to establish a bit configuration that corresponds to the data cell header, and the delivery of said additional bits having a bit configuration which is adapted to enable a requisite function to be controlled more simply within the switching equipment.

This is illustrated schematically in FIGS. 2A, 2B, and 3, which shows additional bits 31 supplied to the data cell 30, which has a header 32 and an information section 33 and forms an internal data cell 30' exiting from the first switch port 3.

The coupling means or devices 11 illustrated in FIGS. 2A and 2B are duplicated with two switch planes A and B, wherein normally only one plane is selected for through-connection.

Although the level of security is high when two switch planes are used, it will be understood that this level of security will be even higher when more than two switch planes are used.

If a lower level of security can be accepted, only one switch plane is needed.

As illustrated in FIG. 2B, the switch port 5 also includes means 5a and 5b for controlling or checking the quality of the data cells. These means are known in principle and will not therefore be described. The means 5a and 5b, however, can be adapted to perform selected calculations in accordance with a given algorithm, controlled by an occurrent bit configuration in the data cells, or establish current or instaneous quality in some other way and therewith cause a switch 5c to select one or both of the switch planes A or B.

A unit 5d constructed to remove the additional bit configuration 31 is provided downstream of the switch 5c.

FIG. 3 is a greatly simplified illustration of how the information content of the header 32 of each incoming data cell 30 is evaluated in an incoming link 3.

It is assumed here that additional bit configurations calculated in the processor of the control means 10 in dependence on earlier arriving data cells having a clearly stated virtual address have earlier been stored in a memory 12, as described in more detail herebelow.

The information content of the header 32 is evaluated with regard to the address and its content is tabled in the memory 12. This table will then provide corresponding, significant additional bit configurations adapted for controlling the functions of the switching equipment, these additional bits 31 being placed before the header 32. This results in a longer internal data cell 30' than the standardized data cell 30.

Figure 4:
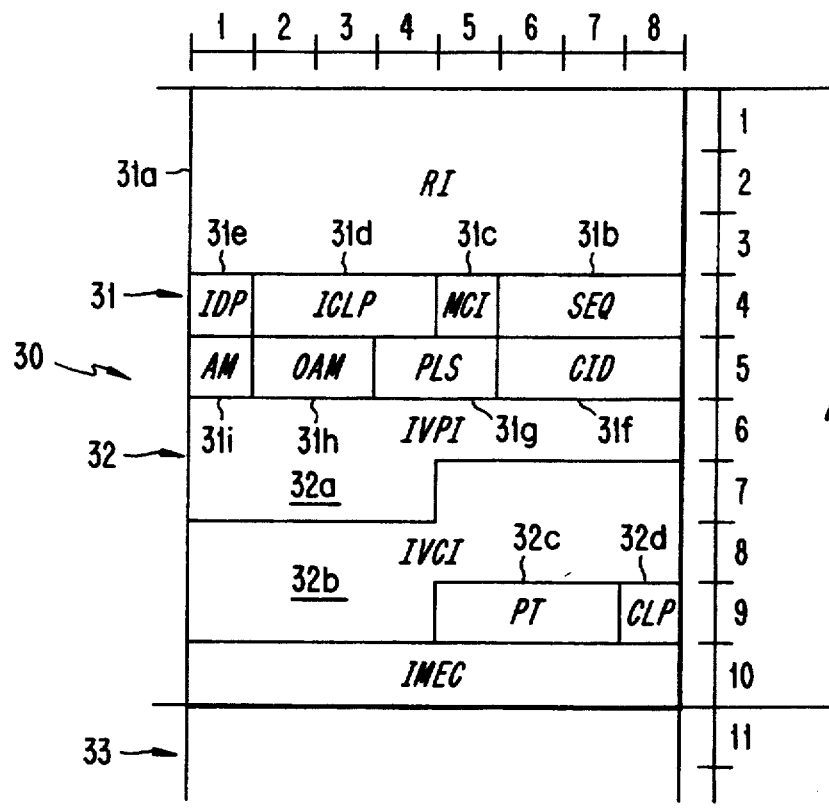
FIG. 4 illustrates an example of a standardized bit configuration for a data cell header, and an example of an additional bit configuration significant to the invention.

FIG. 4 illustrates an example of how the bit positions can distribute themselves within a region 31 applicable to the additional bits, and within a region 32 applicable to the data cell header.

The positions 31a represent RI (Routing Information), the positions 31b represent SEQ (Cell Sequence Number), the positions 31c represent MCI (Multi Cast Indication), the positions 31d represent ICLP (Implicit Cell Loss Priority), the position 31e represents IDP (Implicit Delay Priority), the positions 31f represent CID (Cell Identifier), the positions 31g represent PLS (Plane Select), the positions 31h represent OAM (Operation and Maintenance) and the position 31i represents AM (Address Mode).

The positions 32a represent VPI (Virtual Path Identifier), the positions 32b represent VCI (Virtual Channel Identifier), the positions 32c represent PT (Payload Type) and the position 32d represents CLP (Cell Loss Priority).

The information content in the bit positions 32a and 32b is detected in particular and these are transposed by the control means or the memory for introduction into the positions 31d, 31e, 31f and 31g.

A data cell 30' thus supplemented with an additional bit configuration now passes through the switching equipment 11 and only the additional bits 31 generated are used to control operational functions. The bits 31 may advantageously contain information relating to the type of cell concerned and the transmission quality requested.

The information contained by the header 32 is not used internally in the switch, but is allowed to pass unused through the switching equipment.

Figure 5:
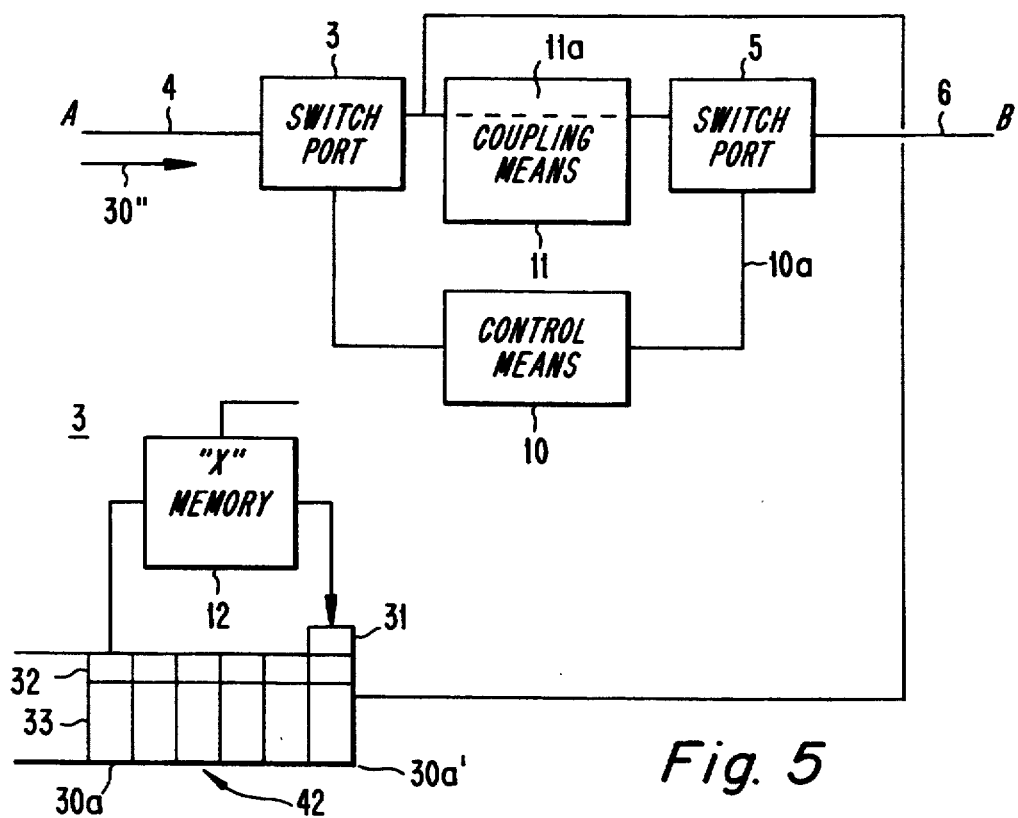
FIG. 5 is a highly simplified block schematic which illustrates those means required to exemplify a possibility of evaluating the bit configuration of said bits included in the data cell header and to generate said additional bits.

FIG. 5 is a highly schematic, principle illustration of one connection possibility within the switching equipment, this possibility being one among many possibilities.

If it is assumed that a calling subscriber A wishes to be connected with a called subscriber B, a data cell 30" which includes, among other things, an address part (header) and an information part will appear on the link 4. The address part calls for a connection with the processor of the control means 10 while the information part discloses the desired connection with subscriber B.

The header of the data cell 30" generated by the A-subscriber carries signalling information and requires direct access to the processor of the control means 10.

The incoming switch port 3 is therewith connected to the processor in the control means 10 by the coupling devices or means 11.

On the basis of the content of this data cell, and particularly within the information part (Payload) of the cell, the processor will now calculate, process and analyze a suitable connection path 11a between the subscriber A and the subscriber B and allot a channel number to said connection.

In addition, an additional bit configuration 31 is evaluated for this channel number "x".

In brief, it can be said that a selected channel number "x" is transmitted to the A-subscriber, who can begin transmission over the allocated channel "x", while evaluated additional bit configuration for channel "x" is stored in the memory 12.

The additional bit configuration is now sent to the switch ports 3 and a RAM memory 12 via internal signalling 10a, through the coupling devices 11, and there seizes a channel number "X".

The A-subscriber has therewith obtained a clear signal and all of the data cells therefrom will be allocated the channel number "X" in addition to all other information.

When the call is ended, there is generated a new data cell which carries signalling information and the processor receives a message that the connection shall be released, through the information part of said cell.

The release signal erases the channel number "x" and the associated additional bit configuration from the memory 12.

The control means 10 of the switching equipment thus interprets the address information and the information part given by the data cell 30" and by means of internal processing points-out a free connection 11a through the coupling devices 11 to a free outgoing switch port 5 and the link 6.

The memory 12 will add these additional bits 31 for each subsequent data cell that has the same channel number "x", when the data cell has advanced to the last given position in the buffer register and the control unit 10 is fully disconnected from this function.

Especially proposed is the possibility of evaluating the information content in the bit positions VPI/VCI, so as to obtain corresponding additional bit configurations via the memory 12.

These additional bits may also advantageously be selected to represent the following criteria and/or functions:

To identify or distinguish between different types of data cells:
a) Empty cells.
b) Through-connection cells.
c) Test cells.
d) Metasignalling cells; internal signalling in the switch in conjunction with start and restart procedures.
e) Signalling cells for switch-internal use.
f) Traffic cells.
g) Erroneous test cells.

To identify data cells that represent different requirements of redundancy termination.

One example of this is to select the A plane or the B plane in a two-plane switch, or to select both planes.

To distinguish between cells that represent different transmission qualities.

An example of this is to distinguish between connections having mutually different cell delay priorities, or to distinguish between connections that have mutually different cell loss priorities.

A normal switch operation will require a number of types of data cells and the switch itself is able to generate a number of types of data cells in addition to the normal data cells arriving from the user.

Furthermore, a number of switch operations may need to handle the data cells differently, depending on the type of data cells concerned.

As earlier schematically described, at the moment of establishing a connection, the switching equipment may agree with the subscriber or user as to a chosen transmission quality and a main processor will inform the switch ports concerned as to which additional bits and which configuration shall apply for the connection concerned, prior to switching on traffic.

The memory 12 shall contain all specific bits that are to be delivered to the data cell 30, and the interpretation of these bits has been determined beforehand, as well as the precise position of these bits in relation to one another.

Bits that are delivered to a data cell in the form of an ATM cell may be binary-coded for different purposes and different areas of use, so as to reduce the number of bits delivered. An example of such coding could be bits that indicate different cell types:

| Bits: | Cell Type |
|---|---|
| 0,0,0: | Empty cells |
| 0,0,1: | Test cells |
| 0,1,0: | Metasignalling cells |
| 0,1,1: | Traffic cells |
| 1,0,0: | Signalling cell (switch-internal) |
| 1,0,1: | Through-connection cells |
| 1,1,0: | Erroneous test cells. (Generated with the intention of discovering hardware errors or faults) |

Naturally, if there is no need to limit the number of bits delivered, respective cell types may also be allocated an own bit. The metasignalling cells and the signalling internally of the switch must not be confused with similar cells on the access links 4.

When concerned with distinguishing between different types of data cells, it can be mentioned that a redundancy terminating function concerns primarily the selection of the switch plane that provides the best signal and message transmission.

Empty cells are transmitted over the switch-internal interfaces in order to maintain cell synchronization. These cells are generated by a transmitting unit and are removed by the receiving unit. The empty-cell removing function need not tackle clarification of the VPI/VCI information of the cells in order to discover empty cells. A simple check on the cell-type indicating bit or bits will be sufficient to establish whether or not the cell concerned is an empty cell.

Through-connection cells are intended to test the path set-up through the hardware for the connection concerned.

Test cells are generated within the switch and are used to handle switch maintenance. It can be ascertained whether or not the hardware functions satisfactorily by transmitting test cells in specified test loops, which may also facilitate the localization of faults.

Metasignalling cells and signalling cells are used for signalling on integrated control paths through a switch. Metasignalling cells differ from signalling cells in that metasignalling cells are able to reach their intended destination even when the switch is configured. Metasignalling cells must therefore be processed separately by a number of functions.

The metasignalling cells relate particularly to internal signalling within the switching equipment in conjunction with start and restart procedures.

By erroneous test cells is meant data cells into which an error has purposely been introduced and where this error is intended to generate a predetermined result when the switching equipment functions as intended.

The transmission quality can be chosen advantageously for each signal or message transmission.

An ATM-switch can be equipped with one or more redundant switch planes, so as to enhance the reliability of the switch. The redundancy of a switch is terminated at the combination point of the cell currents from the switch plane. A specified algorithm can then select cells from that plane which appears to maintain the best quality. It may be desirable for certain types of cell to predetermine the switch plane through which the cell shall pass. By providing the cells with a number of plane select bits, these cells can be processed separately in conjunction with redundancy termination (compare 5a and 5b and 5c in FIG. 2B).

Conceivable coding of a number of plane select bits in an ATM-switch constructed of two switch planes is given below:

| | Plane Select Bits. Plane Selected |
|---|---|
| 0,0: | Termination via a specified algorithm. |
| 0,1: | Cells from plane B reach their intended destination. |
| 1,0: | Cells from plane A reach their intended destination. |
| 1,1: | Cells from both planes reach their intended destination. |

The ATM-switch will route a large number of different types of connection. These connections may have completely different transmission quality requirements.

By transmission quality is meant here the probability of losing cells and of delay through the transport network. CCITT has proposed a number of priority classes (Quality of Services) so that different connections can be offered different transmission qualities.

In order to render it unnecessary to equip functions within the actual switch core with a memory that contains a priority class for each VPI/VCI information, the cells can be provided with a plurality of bits on the switch input. These bits indicate implicit priority classes, either the cell loss priority (CLP) or the cell delay priority (CDP).

It will be understood that the invention is not restricted to the aforedescribed and illustrated exemplifying embodiments thereof and that modifications can be made within the scope of the following Claims.

We claim:

1. A packet switch in a telecommunication system, comprising:
   first switch ports for connecting a plurality of incoming links to the packet switch;
   second switch ports for connecting a plurality of outgoing links to the packet switch;
   coupling means for connecting an incoming link to an indicated outgoing link, wherein indication of the outgoing link is initiated by signals in a form of one or more data cells occurring on the incoming link;
   means in the first switch port for delivering additional information in the form of additional bits to each data cell, the additional bits being configured to correspond to address information occurring in the respective data cell header to control a selected function of the packet switch;
   means in the second switch port for removing the additional bits; and
   control means for controlling operation of the first and second switch ports and the coupling means;
   wherein the additional bits include at least one of a plurality of bit positions representing a type of the data cell concerned and a plurality of other bit positions representing a function of the data cell concerned.

2. The packet switch of claim 1, further comprising means for evaluating at least one of a data cell's type and function by looking up the cell's additional bits in a table in a memory.

3. The packet switch of claim 2, wherein a data cell's additional bits have a configuration corresponding to the cell's type and transmission quality.

4. The packet switch of claim 1, wherein a data cell's additional bits have a configuration corresponding to the cell's type and transmission quality.

5. The packet switch of claim 1, wherein operation of the switch is controlled according to the additional bits.

6. The packet switch of claim 5, wherein a redundancy terminating operation is controlled according to additional bits having a selected configuration.

7. The packet switch of claim 5, wherein the additional bits identify special data cells, a special data cell being one of an empty cell, a through-connection cell, a test cell, a metasignalling cell, a signalling cell, a traffic cell and an erroneous test cell.

8. The packet switch of claim 5, wherein a data cell's additional bits indicate one of whether the data cell is permitted to pass through the switch and whether a redundancy terminating operation shall be carried out.

9. The packet switch of claim 5, wherein some of a data cell's additional bits identify a connection having a predetermined cell delay priority, and others of the data cell's additional bits identify a connection having a predetermined cell loss priority.

10. The packet switch of claim 1, wherein a redundancy terminating operation is controlled according to additional bits having a selected configuration.

11. The packet switch of claim 1, wherein the additional bits identify special data cells, a special data cell being one of an empty cell, a through-connection cell, a test cell, a metasignalling cell, a signalling cell, a traffic cell, and an erroneous test cell.

12. The packet switch of claim 1, wherein a data cell's additional bits indicate one of whether the data cell is permitted to pass through the switch and whether a redundancy terminating operation shall be carried out.

13. The packet switch of claim 1, wherein some of a data cell's additional bits identify a connection having a predetermined cell delay priority, and others of the data cell's additional bits identify a connection having a predetermined cell loss priority.

14. The packet switch of claim 1, wherein the coupling means comprises at least first and second switch planes, data cells passing through both switch planes for redundancy; and the additional bits in a data cell control at least one of: termination of the redundancy according to a specified algorithm; whether data cells reach their intended destination via the first switch plane; whether data cells reach their intended destination via the second switch plane; and whether data cells reach their intended destination via both switch planes.

15. The packet switch of claim 1, wherein the additional information represents VPI/VCI information occurrent in the data cell.

16. The packet switch of claim 1, wherein the switch is an ATM-type switch.

17. A packet switch in a telecommunication system, comprising:
   first switch ports for connecting a plurality of incoming links to the switch;
   second switch ports for connecting a plurality of outgoing links to the switch;
   control means and coupling means for connecting an incoming link to an indicated outgoing link, wherein indication of the outgoing link is initiated by signals in the form of one or more data cells occurring on the incoming link;
   means for delivering additional in formation in the first switch port to each data cell in the form of additional bits, the additional bits being configured to correspond to address information occurring in the respective data cell header to control a selected function of the packet switch;
   means for removing the additional bits in the second switch port;
   wherein the additional bits include a plurality of bit positions representing a type of the data cell concerned, the type including at least one of an empty cell, a through-connection cell, a test cell, a metasignalling cell, a signalling cell, a traffic cell, and an erroneous test cell, the additional bits further including a plurality of other bit positions representing a function of the data cell concerned, the function including at least one of redundancy termination and determination of transmission quality.

* * * * *